US012054358B2

(12) United States Patent
Sato

(10) Patent No.: US 12,054,358 B2
(45) Date of Patent: Aug. 6, 2024

(54) GUIDE DEVIATION DETECTION DEVICE FOR ELEVATORS

(71) Applicant: Mitsubishi Electric Corporation, Tokyo (JP)

(72) Inventor: Shinichi Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/020,636

(22) PCT Filed: Nov. 4, 2020

(86) PCT No.: PCT/JP2020/041233
§ 371 (c)(1),
(2) Date: Feb. 10, 2023

(87) PCT Pub. No.: WO2022/097209
PCT Pub. Date: May 12, 2022

(65) Prior Publication Data

US 2023/0348230 A1 Nov. 2, 2023

(51) Int. Cl.
*B66B 5/16* (2006.01)
*B66B 7/02* (2006.01)

(52) U.S. Cl.
CPC . *B66B 5/16* (2013.01); *B66B 7/02* (2013.01)

(58) Field of Classification Search
CPC .... B66B 5/24; B66B 7/06; B66B 7/12; B66B 7/1215; B66B 7/02; B66B 5/02
See application file for complete search history.

(56) References Cited

U.S. PATENT DOCUMENTS

2016/0376125 A1* 12/2016 Wells .................... B66B 5/022 187/266
2018/0305176 A1* 10/2018 Miyajima .............. G01S 17/58

FOREIGN PATENT DOCUMENTS

CN 104555636 A * 4/2015 .............. B66B 5/00
JP 55-129274 U1 9/1980
JP 7-149482 A 6/1995
(Continued)

OTHER PUBLICATIONS

International Search Report mailed on Dec. 22, 2020, received for PCT Application PCT/JP2020/041233, filed on Nov. 4, 2020, 5 pages including English Translation.

*Primary Examiner* — Diem M Tran
(74) *Attorney, Agent, or Firm* — XSENSUS LLP

(57) ABSTRACT

A guide deviation detection device for elevators that can improve accuracy of detecting that an ascending and descending body has deviated from a correctly guided state is provided. The guide deviation detection device for elevators includes a base provided in an ascending and descending body, a contact maker that is provided in the base to be adjacent to a long object positioned with an ascending and descending direction of the ascending and descending body set as a longitudinal direction, does not come into contact with the long object to take a reference posture when the ascending and descending body is in a correctly guided state, and comes into contact with the long object to change a posture from the reference posture when the ascending and descending body deviates from the correctly guided state, and a detector detects that the contact maker changes the posture from the reference posture.

5 Claims, 5 Drawing Sheets

(56) References Cited

FOREIGN PATENT DOCUMENTS

| | | | |
|---|---|---|---|
| JP | 9-100078 | A | 4/1997 |
| WO | 2016/027298 | A1 | 2/2016 |

* cited by examiner

Fig. 4

| STATE | DETECTION OF DEVIATED-FROM-RAIL STATE |
|---|---|
| NORMAL (NONCONTACT) | OFF |
| GUIDE DEVIATION DETECTION DEVICE INTERRUPTS CIRCUIT | ON |
| POWER SUPPLY TO CONTROL CIRCUIT IS STOPPED | ON |
| POWER CIRCUIT STOPS POWER SUPPLY | ON |
| LEAD WIRE IS DISCONNECTED | ON |
| ONE OF CONTACTS OF DETECTOR IS IN ON-FAILURE | OFF (*) |
| ONE OF CONTACTS OF DETECTOR IS IN OFF-FAILURE | ON |
| ONE OF RELAY CONTACTS IS IN ON-FAILURE | OFF (**) |
| ONE OF RELAY CONTACTS IS IN OFF-FAILURE | ON |

Fig. 5

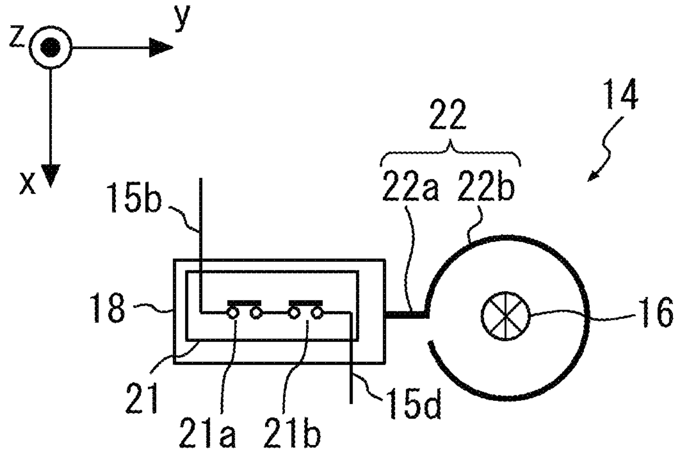

GUIDE DEVIATION DETECTION DEVICE FOR ELEVATORS

CROSS-REFERENCE TO RELATED APPLICATION

The present application is based on PCT filing PCT/JP2020/041233, filed Nov. 4, 2020, the entire contents of which are incorporated herein by reference.

FIELD

The present disclosure relates to a guide deviation detection device for elevators.

BACKGROUND

FIG. 10 and the like of PTL 1 discloses a guide deviation detection system for elevators. In the guide deviation detection system, a wire is provided from the bottom end to the top end of a shaft. A ring is provided in an ascending and descending body. The wire is passed through the ring. When the ascending and descending body is correctly guided with respect to an ascending and descending direction, the ring does not come into contact with the wire. When the ascending and descending body deviates from a state in which the ascending and descending body is correctly guided with respect to the ascending and descending direction, the ring comes into contact with the wire. At this time, the wire changes to a state in which an electric current flows to the wire. A detector detects the electric current flowing to the wire to detect that the ascending and descending body has deviated from the state in which the ascending and descending body is correctly guided with respect to the ascending and descending direction.

CITATION LIST

Patent Literature

[PTL 1] JP H7-149482 A

SUMMARY

Technical Problem

However, in the guide deviation detection system described in FIG. 10 and the like of PTL 1, when the surface of the wire or the ring has deteriorated over time, an electric current sometimes does not flow to the wire even if the wire and the ring come into contact. In this case, the detector does not detect that the ascending and descending body has deviated from the state in which the ascending and descending body is correctly guided with respect to the ascending and descending direction.

The present disclosure has been devised in order to solve the problem described above. An object of the present disclosure is to provide a guide deviation detection device for elevators that can improve accuracy of detecting that an ascending and descending body has deviated from a state in which the ascending and descending body is correctly guided with respect to an ascending and descending direction.

Solution to Problem

A guide deviation detection device for elevators according to the present disclosure includes: a base provided in an ascending and descending body that ascends and descends while being guided; a contact maker that is provided in the base to be adjacent to a long object positioned with an ascending and descending direction of the ascending and descending body set as a longitudinal direction thereof, does not come into contact with the long object to take a reference posture with respect to the base when the ascending and descending body is in a state in which the ascending and descending body is correctly guided with respect to the ascending and descending direction, and comes into contact with the long object to change a posture from the reference posture with respect to the base when the ascending and descending body changes to a state in which the ascending and descending body deviates from the state in which the ascending and descending body is correctly guided with respect to the ascending and descending direction; and a detector that is provided in the ascending and descending body and detects that the contact maker has changed the posture from the reference posture.

A guide deviation detection device for elevators according to the present disclosure includes: a base provided in an ascending and descending body that ascends and descends while being guided; a first contact maker that is provided in the base to be adjacent to one side of a long object positioned with an ascending and descending direction of the ascending and descending body set as a longitudinal direction, does not come into contact with the long object to take a first reference posture with respect to the base when the ascending and descending body is in a state in which the ascending and descending body is correctly guided with respect to the ascending and descending direction, and comes into contact with the long object to change a posture from the first reference posture with respect to the base when the ascending and descending body changes to a state in which the ascending and descending body deviates to another side of the long object from the state in which the ascending and descending body is correctly guided with respect to the ascending and descending direction; a second contact maker that is provided in the base to be adjacent to the other side of the long object positioned with the ascending and descending direction of the ascending and descending body set as the longitudinal direction, does not come into contact with the long object to take a second reference posture with respect to the base when the ascending and descending body is in the state in which the ascending and descending body is correctly guided with respect to the ascending and descending direction, and comes into contact with the long object to change a posture from the second reference posture with respect to the base when the ascending and descending body changes to a state in which the ascending and descending body deviates to the one side of the long object from the state in which the ascending and descending body is correctly guided with respect to the ascending and descending direction; and a detector that is provided in the ascending and descending body and detects that the first contact maker changes the posture from the first reference posture and the second contact maker changes the posture from the second reference posture.

Advantageous Effects of Invention

According to the present disclosure, the detector is provided in the ascending and descending body. The detector detects that the contact maker or the like has changed the posture from the reference posture or the like. Accordingly, the detector can directly detect that the contact maker or the like has come into contact with the long object. As a result, it is possible to improve accuracy of detecting that the counterweight has deviated from the state in which the counterweight is correctly guided with respect to the ascending and descending direction.

BRIEF DESCRIPTION OF DRAWINGS

FIG. 4 is a diagram showing detection of the deviated-from-rail state by the control circuit of the elevator system to which the guide deviation detection device for elevators in the first embodiment is applied.

FIG. 5 is a plan view of a modification of a guide deviation detection device for elevators in the first embodiment.

DESCRIPTION OF EMBODIMENTS

Figure 1:
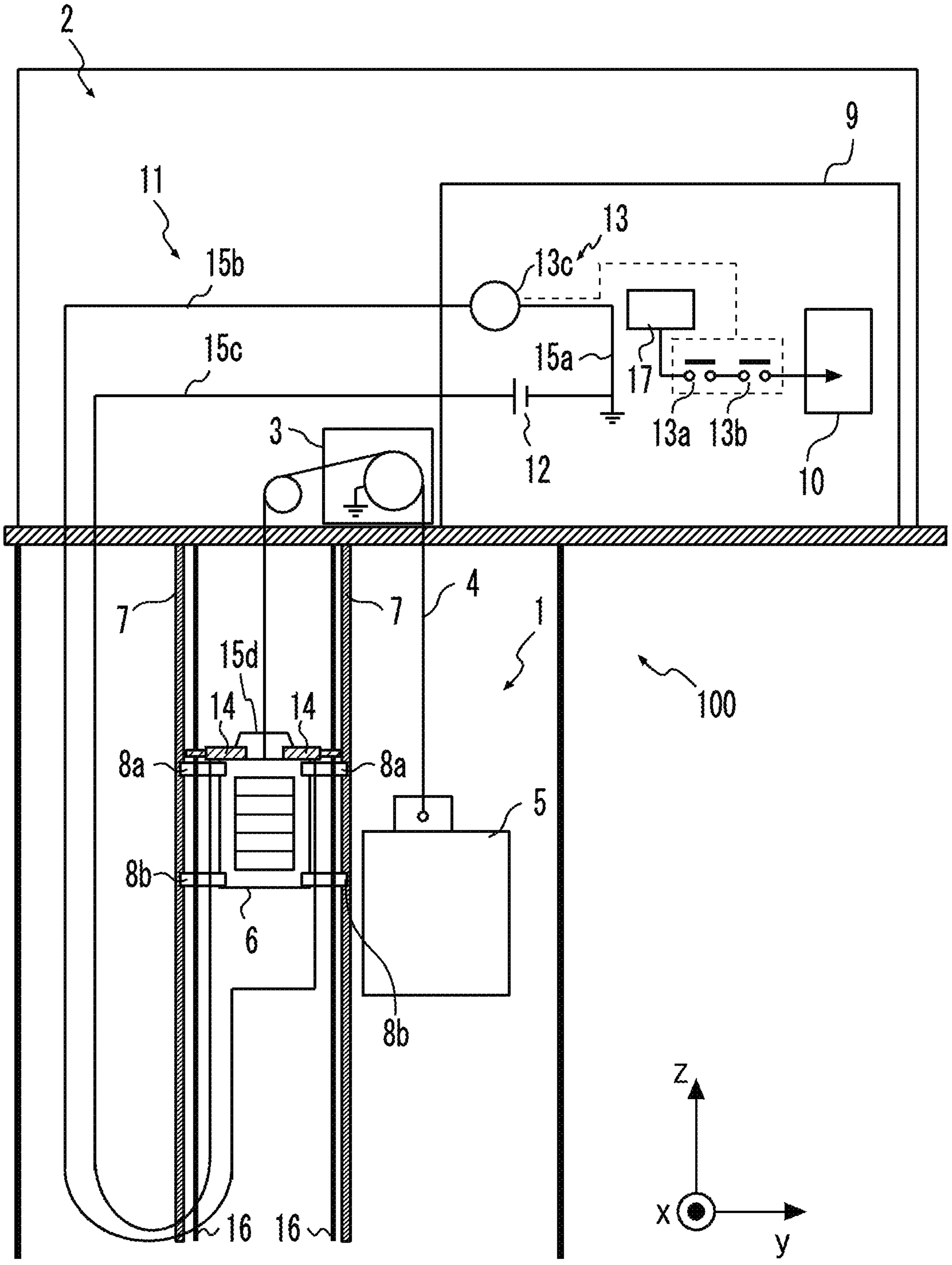
FIG. 1 is a schematic diagram of an elevator system to which a guide deviation detection device for elevators in a first embodiment is applied.

Modes for carrying out the present disclosure are explained with reference to the accompanying drawings. Note that, in the figures, the same or equivalent portions are denoted by the same reference numerals and signs. Redundant explanation of the portions is simplified or omitted as appropriate.

First Embodiment

FIG. 1 is a schematic diagram of an elevator system to which a guide deviation detection device for elevators in a first embodiment is applied.

In FIG. 1, a +x direction is a direction from the depth side to the near side of the paper surface. A +y direction is a direction from the left side to the right side of the paper surface. A +z direction is a direction from the lower side to the upper side of the paper surface.

In an elevator system 100 shown in FIG. 1, a shaft 1 passes through floors of a not-shown building. A machine room 2 is provided directly above the shaft 1.

A traction machine 3 is provided in the machine room 2. A main rope 4 is wound on the traction machine 3. A car 5 is positioned in the shaft 1 as an ascending and descending body. The car 5 is supported on one side of the main rope 4. A counterweight 6 is positioned in the shaft 1 as another ascending and descending body. The counterweight 6 is supported on the other side of the main rope 4.

A pair of guide rails 7 is provided as long objects in the shaft 1. The pair of guide rails 7 is provided in parallel to each other with a longitudinal direction thereof set as the vertical direction. One of the pair of guide rails 7 is adjacent to one side of the counterweight 6. The other of the pair of guide rails 7 is adjacent to the other side of the counterweight 6.

One of a pair of first guide shoes 8*a* is provided on one side of an upper part of the counterweight 6. One of the pair of first guide shoes 8*a* is provided to be able to be guided by one of the pair of guide rails 7. The other of the pair of first guide shoes 8*a* is provided on the other side of the upper part of the counterweight 6. The other of the pair of first guide shoes 8*a* is provided to be able to be guided by the other of the pair of guide rails 7.

One of a pair of second guide shoes 8*b* is provided on one side of a lower part of the counterweight 6. One of the pair of second guide shoes 8*b* is provided to be able to be guided by one of the pair of guide rails 7. The other of the pair of second guide shoes 8*b* is provided on the other side of the lower part of the counterweight 6. The other of the pair of second guide shoes 8*b* is provided to be able to be guided by the other of the pair of guide rails 7.

A control panel 9 is provided in the machine room 2. The control panel 9 includes a control circuit 10. The control circuit 10 is provided to be able to control the elevator system 100 as a whole.

A guide deviation detection system 11 includes a power circuit 12, a relay 13, a pair of guide deviation detection devices 14, a lead wire 15*a*, a lead wire 15*b*, a lead wire 15*c*, a lead wire 15*d*, and a pair of wires 16.

The power circuit 12 is provided on the inside of the control panel 9.

For example, the relay 13 is an electromagnetic relay. The relay 13 is provided on the inside of the control panel 9. The relay 13 includes a relay contact 13*a*, a relay contact 13*b*, and a relay coil 13*c*.

The relay contact 13*a* is a form A contact. The relay contact 13*b* is a form A contact. The relay contact 13*a* and the relay contact 13*b* are electrically connected in series. The relay coil 13*c* is provided to be able to simultaneously operate the relay contact 13*a* and the relay contact 13*b*.

One of the pair of guide deviation detection devices 14 is provided on one side of the upper part of the counterweight 6 above one of the pair of first guide shoes 8*a*.

The other of the pair of guide deviation detection devices 14 is provided on the other side of the upper part of the counterweight 6 above the other of the pair of first guide shoes 8*a*.

The lead wire 15*a* is provided on the inside of the control panel 9. The lead wire 15*a* electrically connects the power circuit 12 and the relay coil 13*c*.

The lead wire 15*b* is positioned between the control panel 9 and one side of the upper part of the counterweight 6 passing through the shaft 1 and the machine room 2. The lead wire 15*b* electrically connects one of the pair of guide deviation detection devices 14 and the relay coil 13*c*.

The lead wire 15*c* is positioned between the control panel 9 and the other side of the upper part of the counterweight 6 passing through the shaft 1 and the machine room 2. The lead wire 15*c* electrically connects the power circuit 12 and the other of the pair of guide deviation detection devices 14.

The lead wire 15*d* is provided in the upper part of the counterweight 6. The lead wire 15*d* electrically connects one and the other of the pair of guide deviation detection devices 14.

One of the pair of wires 16 is stretched as a long object from the upper end portion to the lower end portion of the shaft 1. One of the pair of wires 16 is parallel to one of the pair of guide rails 7. One of the pair of wires 16 passes between one of the pair of guide rails 7 and the counterweight 6. One of the pair of wires 16 is adjacent to the tip of the one of the pair of guide deviation detection devices 14.

The other of the pair of wires 16 is stretched as a long object from the upper end portion to the lower end portion of the shaft 1. The other of the pair of wires 16 is parallel to the other of the pair of guide rails 7. The other of the pair of wires 16 passes between the other of the first guide rails 7 and the counterweight 6. The other of the pair of wires 16 is adjacent to the tip of the other of the pair of guide deviation detection devices 14.

A signal output circuit 17 is provided on the inside of the control panel 9. The signal output circuit 17 is connected to the control circuit 10 via the relay contact 13*a* and the relay contact 13*b*. The signal output circuit 17 is provided to be able to always output a signal.

In the elevator system 100, the control circuit 10 outputs a driving instruction to the traction machine 3. The traction machine 3 rotates based on the driving instruction. The main rope 4 moves following the rotation of the traction machine 3. The car 5 and the counterweight 6 ascend and descend in opposite directions each other following the movement of the main rope 4. At this time, the counterweight 6 ascends and descends while being correctly guided by the pair of guide rails 7 with respect to an ascending and descending direction via the pair of first guide shoes 8*a* and the pair of second guide shoes 8*b*.

When the counterweight 6 is correctly guided by the pair of guide rails 7 with respect to the ascending and descending direction, one of the pair of guide deviation detection devices 14 maintains connection of the lead wire 15*b* and the lead wire 15*d*. The other of the pair of guide deviation detection devices 14 maintains connection of the lead wire 15*c* and the lead wire 15*d*. In this case, the power circuit 12 feeds an electric current to the relay coil 13*c*. When the electric current is flowing to the relay coil 13*c*, the relay contact 13*a* and the relay contact 13*b* are in a closed state. In this case, the control circuit 10 detects a signal output from the signal output circuit 17.

When at least one of the pair of first guide shoes 8*a* and the pair of second guide shoes 8*b* deviates from the pair of guide rails 7, the counterweight 6 deviates from a state in which the counterweight 6 is correctly guided by the pair of guide rails 7 with respect to the ascending and descending direction. Specifically, the counterweight 6 falls into a deviated-from-rail state. When falling into the deviated-from-rail state, the counterweight 6 moves in the +x direction or a −x direction.

For example, when one side of the counterweight 6 moves in the +x direction, one of the pair of guide deviation detection devices 14 moves in the +x direction together with one side of the counterweight 6. In this case, one of the pair of guide deviation detection devices 14 comes into contact with the wire 16 from the −x direction. At this time, one of the pair of guide deviation detection devices 14 disconnects the lead wire 15*b* and the lead wire 15*d*. As a result, the relay coil 13*c* changes to a state in which an electric current does not flow to the relay coil 13*c*. When an electric current does not flow to the relay coil 13*c*, the relay contact 13*a* and the relay contact 13*b* change to an opened state. In this case, the control circuit 10 does not detect a signal output from the signal output circuit 17.

For example, when one side of the counterweight 6 moves in the −x direction, one of the pair of guide deviation detection devices 14 moves in the −x direction together with one side of the counterweight 6. In this case, one of the pair of guide deviation detection devices 14 comes into contact with the wire 16 from the +x direction. At this time, one of the pair of guide deviation detection devices 14 disconnects the lead wire 15*b* and the lead wire 15*d*. As a result, the relay coil 13*c* changes to the state in which an electric current does not flow to the relay coil 13*c*. When an electric current does not flow to the relay coil 13*c*, the relay contact 13*a* and the relay contact 13*b* change to the opened state. In this case, the control circuit 10 does not detect a signal output from the signal output circuit 17.

For example, when the other side of the counterweight 6 moves in the +x direction, the other of the pair of guide deviation detection devices 14 moves in the +x direction together with the other side of the counterweight 6. In this case, the other of the pair of guide deviation detection devices 14 comes into contact with the wire 16 from the −x direction. At this time, the other of the pair of guide deviation detection devices 14 disconnects the lead wire 15*c* and the lead wire 15*d*. As a result, the relay coil 13*c* changes to the state in which an electric current does not flow to the relay coil 13*c*. When an electric current does not flow to the relay coil 13*c*, the relay contact 13*a* and the relay contact 13*b* change to the opened state. In this case, the control circuit 10 does not detect a signal output from the signal output circuit 17.

For example, when the other side of the counterweight 6 moves in the −x direction, the other of the pair of guide deviation detection devices 14 moves in the −x direction together with the other side of the counterweight 6. In this case, the other of the pair of guide deviation detection devices 14 comes into contact with the wire 16 from the +x direction. At this time, the other of the pair of guide deviation detection devices 14 disconnects the lead wire 15*c* and the lead wire 15*d*. As a result, the relay coil 13*c* changes to the state in which an electric current does not flow to the relay coil 13*c*. When an electric current does not flow to the relay coil 13*c*, the relay contact 13*a* and the relay contact 13*b* changes to the opened state. In this case, the control circuit 10 does not detect a signal output from the signal output circuit 17.

When a signal output from the signal output circuit 17 is not detected, the control circuit 10 detects that the counterweight 6 has changed to the deviated-from-rail state. At this time, the control circuit 10 performs control corresponding to the counterweight 6 being in the deviated-from-rail state. For example, the control circuit 10 stops the rotation of the traction machine 3 to emergently stop the car 5 and the counterweight 6.

Next, the pair of guide deviation detection devices 14 is explained with reference to FIG. 2.

Figure 2:
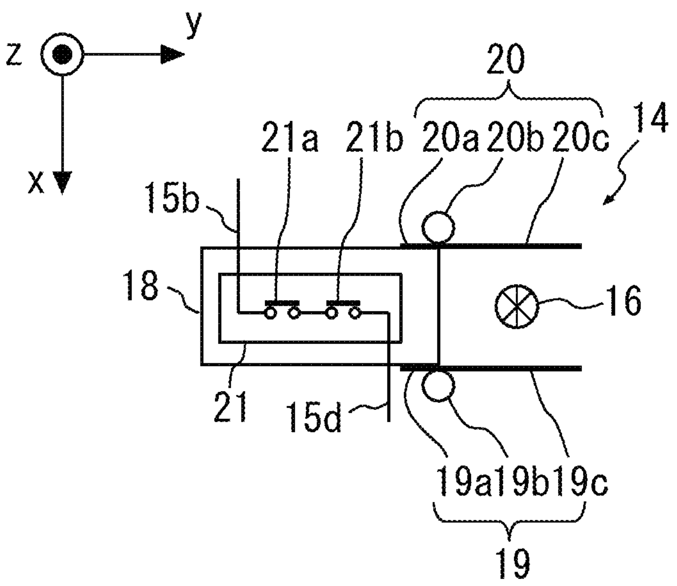
FIG. 2 is a plan view of a guide deviation detection device for elevators in the first embodiment.

FIG. 2 is a plan view of a guide deviation detection device for elevators in the first embodiment.

As shown in FIG. 2, one of the pair of guide deviation detection devices 14 includes a base 18, a first contact maker 19, a second contact maker 20, and a detector 21.

For example, the base 18 has a rectangular parallelepiped shape. The base 18 is positioned on a side in a −y direction of the wire 16. The base 18 is fixed to an upper part of the counterweight 6 not shown in FIG. 2.

For example, the first contact maker 19 is a hinge switch. The first contact maker 19 includes a first attaching section 19*a*, a first rotating section 19*b*, and a first contact section 19*c*.

The first attaching section 19*a* is attached to a side surface on a side in the +x direction in the base 18.

The first rotating section 19*b* is attached to an end portion on a side in the −y direction in the first attaching section 19*a*. The first rotating section 19*b* is provided to be able to rotate centering on a z axis.

The first contact section 19*c* extends in the +y direction from the first rotating section 19*b*. The first contact section 19*c* is adjacent to a side in the +x direction with respect to the wire 16. The first contact section 19*c* is provided to be able to rotate to the opposite side of the wire 16 centering on the first rotating section 19*b*.

For example, the second contact maker 20 is a hinge switch. The second contact maker 20 includes a second attaching section 20*a*, a second rotating section 20*b*, and a second contact section 20*c*.

The second attaching section 20*a* is attached to a side surface on a side in the −x direction in the base 18.

The second rotating section 20*b* is attached to an end portion on a side in the −y direction in the second attaching section 20*a*. The second rotating section 20*b* is provided to be able to rotate centering on the z axis.

The second contact section 20*c* extends in the +y direction from the second rotating section 20*b*. The second contact section 20*c* is adjacent to a side in the −x direction with respect to the wire 16. The second contact section 20*c* is provided to be able to rotate to the opposite side of the wire 16 centering on the second rotating section 20*b*.

The detector 21 is provided on the inside of the base 18. The detector 21 includes a contact 21*a* and a contact 21*b*. The contact 21*a* is a form B contact. The contact 21*b* is a form B contact. The contact 21*a* and the contact 21*b* are electrically connected in series. A series circuit of the contact 21*a* and the contact 21*b* is electrically connected between the lead wire 15*b* and the lead wire 15*d*.

When the counterweight 6 is correctly guided by the pair of guide rails 7 with respect to the ascending and descending direction, the wire 16 is located between the first contact section 19*c* and the second contact section 20*c*. In this case, the first contact section 19*c* takes a first reference posture. The second contact section 20*c* takes a second reference posture. Specifically, the first contact section 19*c* and the second contact section 20*c* are maintained in a state in which the first contact section 19*c* and the second contact section 20*c* are parallel on a horizontal projection plane. In this case, the contact 21*a* and the contact 21*b* are maintained in a closed state. As a result, the pair of guide deviation detection devices 14 maintains electric connection of the lead wire 15*b* and the lead wire 15*d*.

Although not shown, the other of the pair of guide deviation detection devices 14 has the same configuration as the configuration of one of the pair of guide deviation detection devices 14. The other of the pair of guide deviation detection devices 14 maintains electric connection of the lead wire 15*c* and the lead wire 15*d*.

Next, an operation of the pair of guide deviation detection devices 14 is explained with reference to FIG. 3A and FIG. 3B.

Figure 3A:
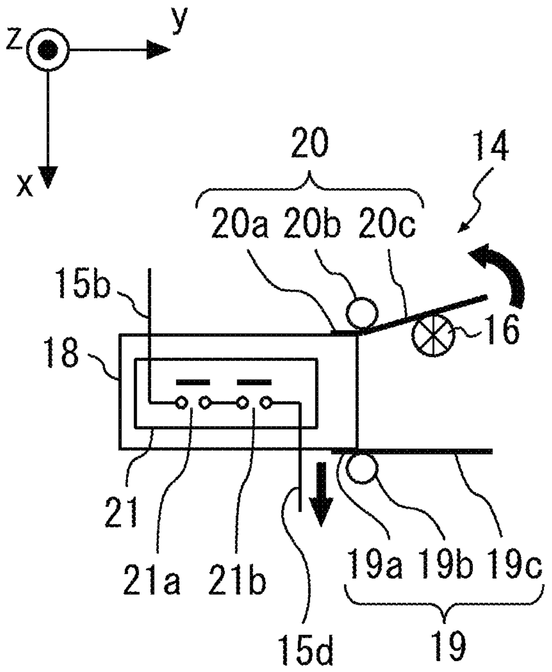
FIG. 3A and FIG. 3B are plan views for explaining an operation of the guide deviation detection device for elevators in the first embodiment.
Figure 3B:
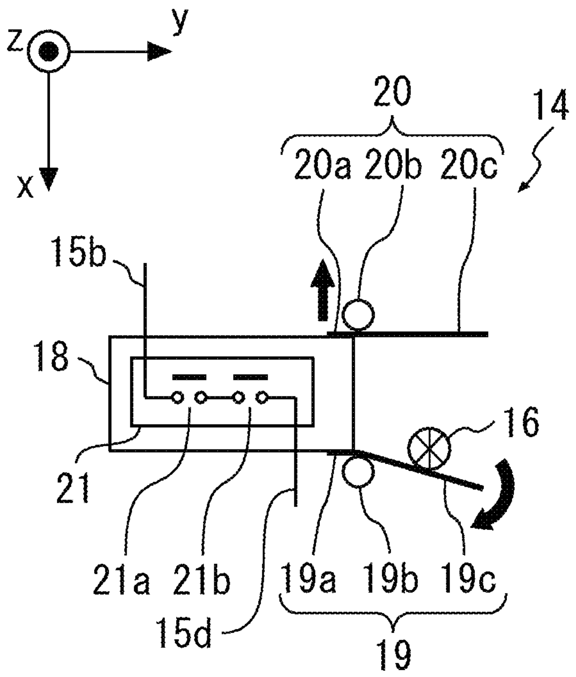

FIG. 3A and FIG. 3B are plan views for explaining an operation of the guide deviation detection device for elevators in the first embodiment.

When the counterweight 6 deviates from a state in which the counterweight 6 is correctly guided by the pair of guide rails 7, one of the pair of guide deviation detection devices 14 moves in the +x direction or the −x direction together with the counterweight 6.

For example, as shown in FIG. 3A, when one of the pair of guide deviation detection devices 14 moves in the +x direction, the second contact section 20*c* comes into contact with the wire 16 from a side in the −x direction. At this time, the second contact section 20*c* changes a posture from the second reference posture when only receiving light force in the −x direction from the wire 16. Specifically, the second contact section 20*c* rotates in the −x direction centering on the second rotating section 20*b*. At this time, the detector 21 detects that the second contact section 20*c* has changed the posture from the second reference posture. The detector 21 switches the contact 21*a* and the contact 21*b* from the closed state to the opened state based on a result of the detection. In this case, the guide deviation detection device 14 electrically disconnects the lead wire 15*b* and the lead wire 15*d*.

For example, as shown in (B) of FIG. 3B, when one of the pair of guide deviation detection devices 14 moves in the −x direction, the first contact section 19*c* comes into contact with the wire 16 from a side in the +x direction. At this time, the first contact section 19*c* changes a posture from the first reference posture when only receiving light force in the +x direction from the wire 16. Specifically, the first contact section 19*c* rotates in the +x direction centering on the first rotating section 19*b*. At this time, the detector 21 detects that the first contact section 19*c* has changed the posture from the first reference posture. The detector 21 switches the contact 21*a* and the contact 21*b* from the closed state to the opened state based on a result of the detection. In this case, the guide deviation detection device 14 electrically disconnects the lead wire 15*b* and the lead wire 15*d*.

Although not shown, the other of the pair of guide deviation detection devices 14 electrically disconnects the lead wire 15*c* and the lead wire 15*d* when the guide deviation detection device 14 moves in the +x direction or moves in the −x direction.

Next, it is explained with reference to FIG. 4 that design of the elevator system 100 is failsafe design.

FIG. 4 is a diagram showing detection of the deviated-from-rail state by the control circuit of the elevator system to which the guide deviation detection device for elevators in the first embodiment is applied.

FIG. 4 is a diagram showing a relation between "STATE" and "DETECTION OF DEVIATED-FROM-RAIL STATE".

The "STATE" represents a state that can occur in the elevator system 100. The "DETECTION OF DEVIATED-FROM-RAIL STATE" indicates whether the control circuit 10 performs detection of the deviated-from-rail state. In the "DETECTION OF DEVIATED-FROM-RAIL STATE", "OFF" indicates that the control circuit 10 does not detect the deviated-from-rail state. In the "DETECTION OF DEVIATED-FROM-RAIL STATE", "ON" indicates that the control circuit 10 detects the deviated-from-rail state.

In the "STATE", "NORMAL (NONCONTACT)" represents a state in which the elevator system 100 is in a normal state and the guide deviation detection device 14 is not in contact with the wire 16. In this case, a signal output from the signal output circuit 17 is input to the control circuit 10. As a result, the "DETECTION OF DEVIATED-FROM-RAIL STATE" changes to "OFF".

In the "STATE", "GUIDE DEVIATION DETECTION DEVICE INTERRUPTS CIRCUIT" represents a state in which the guide deviation detection device 14 interrupts a circuit. In this case, a signal output from the signal output circuit 17 is not input to the control circuit 10. As a result, the "DETECTION OF DEVIATED-FROM-RAIL STATE" changes to "ON".

In the "STATE", "POWER SUPPLY TO CONTROL CIRCUIT IS STOPPED" represents a state in which supply of electric power to the control circuit 10 is stopped. In this case, as at the time when the control circuit 10 detects the deviated-from-rail state, the car 5 and the counterweight 6 are emergently stopped. As a result, the "DETECTION OF DEVIATED-FROM-RAIL STATE" changes to "ON".

In the "STATE", "POWER CIRCUIT STOPS POWER SUPPLY" represents a state in which the power circuit 12 stops the supply of the electric power. In this case, a signal output from the signal output circuit 17 is not input to the control circuit 10. As a result, the "DETECTION OF DEVIATED-FROM-RAIL STATE" changes to "ON".

In the "STATE", "LEAD WIRE IS DISCONNECTED" represents a state in which at least one of the lead wire 15*a*, the lead wire 15*b*, the lead wire 15*c*, and the lead wire 15*d* is disconnected. In this case, a signal output from the signal output circuit 17 is not input to the control circuit 10. As a result, the "DETECTION OF DEVIATED-FROM-RAIL STATE" changes to "ON".

In the "STATE", "ONE OF CONTACTS OF DETECTOR IS IN ON-FAILURE" represents a state in which one of the contacts of the detector 21 is in an ON failure in which the contact is always in a closed state. In this case, a signal output from the signal output circuit 17 is input to the control circuit 10. As a result, "DETECTION OF DEVIATED-FROM-RAIL STATE" is "OFF".

In the "DETECTION OF DEVIATED-FROM-RAIL STATE", "(*)" indicates that the control circuit 10 detects the deviated-from-rail state when the counterweight 6 falls into the deviated-from-rail state in the state in which one of the contacts of the detector 21 is in the ON failure. For example, when the counterweight 6 falls into the deviated-from-rail state in a state in which the contact 21*a* is in the ON failure, the contact 21*b* is switched from the closed state to the opened state. In this case, a signal output from the signal output circuit 17 is not input to the control circuit 10. As a result, the control circuit 10 detects the deviated-from-rail state.

In the "STATE", "ONE OF CONTACTS OF DETECTOR IS IN OFF-FAILURE" represents a state in which one of the contacts of the detector 21 is in an OFF failure in which the contact is always in an opened state. In this case, a signal output from the signal output circuit 17 is not input to the control circuit 10. As a result, the "DETECTION OF DEVIATED-FROM-RAIL STATE" is "ON".

In the "STATE", "ONE OF RELAY CONTACTS IS IN ON-FAILURE" represents a state in which the relay contact 13*a* or the relay contact 13*b* are in the ON failure. In this case, a signal output from the signal output circuit 17 is input to the control circuit 10. As a result, "DETECTION OF DEVIATED-FROM-RAIL STATE" changes to "OFF".

In the "DETECTION OF DEVIATED-FROM-RAIL STATE", "()" indicates that the control circuit 10 detects the deviated-from-rail state when the counterweight 6 falls into the deviated-from-rail state in a state in which the relay contact 13***a* or the relay contact 13*b* is in the ON failure. For example, when the counterweight 6 falls into the deviated-from-rail state in a state in which the relay contact 13*a* is in the ON failure, the relay contact 13*b* is switched from the closed state to the opened state. In this case, a signal output from the signal output circuit 17 is not input to the control circuit 10. As a result, the control circuit 10 detects the deviated-from-rail state.

In the "STATE", "ONE OF RELAY CONTACTS IS IN OFF-FAILURE" represents a state in which the relay contact 13*a* or the relay contact 13*b* is in the OFF failure. In this case, a signal output from the signal output circuit 17 is not input. In this case, the "DETECTION OF DEVIATED-FROM-RAIL STATE" changes to "ON".

According to the first embodiment explained above, the detector 21 is provided in the counterweight 6. The detector 21 detects that the first contact section 19*c* has changed a posture from the first reference posture. The detector 21 detects that the second contact section 20*c* has changed a posture from the second reference posture. Accordingly, the detector 21 can directly detect that the first contact section 19*c* or the second contact section 20*c* has come into contact with the wire 16. As a result, irrespective of whether the counterweight 6 moves in the +x direction or the −x direction, it is possible to improve accuracy of detecting that the counterweight 6 has deviated from a state in which the counterweight 6 is correctly guided with respect to the ascending and descending direction. Even if the first contact section 19*c*, the second contact section 20*c*, and the wire 16 deteriorate over time, it is possible to maintain accuracy of detecting that the counterweight 6 has deviated from the state in which the counterweight 6 is correctly guided with respect to the ascending and descending direction. Further, even if an electric current is not fed to the wire 16, it is possible to detect that the counterweight 6 has deviated from the state in which the counterweight 6 is correctly guided with respect to the ascending and descending direction.

Note that only the first contact maker 19 may be provided. In this case as well, when the counterweight 6 moves in the −x direction, it is possible to detect that the counterweight 6 has deviated from the state in which the counterweight 6 is correctly guided in the ascending and descending direction.

Only the second contact maker 20 may be provided. In this case as well, when the counterweight 6 moves in the +x direction, it is possible to detect that the counterweight 6 has deviated from the state in which the counterweight 6 is correctly guided in the ascending and descending direction.

The guide deviation detection device 14 may be provided in a lower part of the counterweight 6. In this case as well, it is possible to detect that the counterweight 6 has deviated from the state in which the counterweight 6 is correctly guided in the ascending and descending direction.

The guide deviation detection device 14 may be provided to come into contact with the guide rail 7 when the counterweight 6 deviates from the state in which the counterweight 6 is correctly guided with respect to the ascending and descending direction. In this case, the wire 16 may not be provided. In this case as well, it is possible to improve accuracy of detecting that the counterweight 6 has deviated from a state in which the counterweight 6 is correctly guided with respect to the ascending and descending direction.

The detector 21 may be provided to distinguish and detect a change in a posture of the first contact section 19*c* and a change in a posture of the second contact section 20*c* by including two detection circuits. In this case, it is possible to detect in which direction of the +x direction and the −x direction the counterweight 6 has deviated with respect to the ascending and descending direction.

As shown in FIG. 4, the elevator system 100 is a failsafe system. Accordingly, when an abnormality occurs in the guide deviation detection system 11, it is possible to emergently stop the car 5 and the counterweight 6.

The guide deviation detection device 14 may include three or more contacts.

The relay 13 may include three or more contacts.

Note that, although not shown, the car 5 is guided to a pair of guide rails for a car via a plurality of guide shoes. In this case, the guide deviation detection device 14 may be applied to the car 5.

The guide deviation detection system 11 in the first embodiment may be applied to the elevator system 100 in which a machine room is absent and the traction machine 3 and the control panel 9 are provided in an upper part or a lower part of the shaft 1.

Next, a modification of the guide deviation detection device 14 is explained with reference to FIG. 5.

FIG. 5 is a plan view of a modification of a guide deviation detection device for elevators in the first embodiment.

As shown in FIG. 5, the guide deviation detection device 14 includes a contact maker 22.

The contact maker 22 includes an arm section 22*a* and a third contact section 22*b*.

The arm section 22*a* is attached to a side surface on a side in the +y direction in the base 18. The arm section 22*a* extends in the +y direction from the base 18 in the reference posture. The arm section 22*a* is provided to be able to rotate in the +x direction or the −x direction centering on a portion attached to the base 15.

The third contact section 22*b* is formed such that a part of a circle is not connected. An end portion of the third contact section 22*b* is coupled to the end portion in the +y direction of the arm section 22*a*. The third contact section 22*b* surrounds a part of the outer circumference of the wire 16 in the reference posture.

Next, an operation in the modification of the guide deviation detection device 14 is explained with reference to FIG. 6A and FIG. 6B.

Figure 6A:
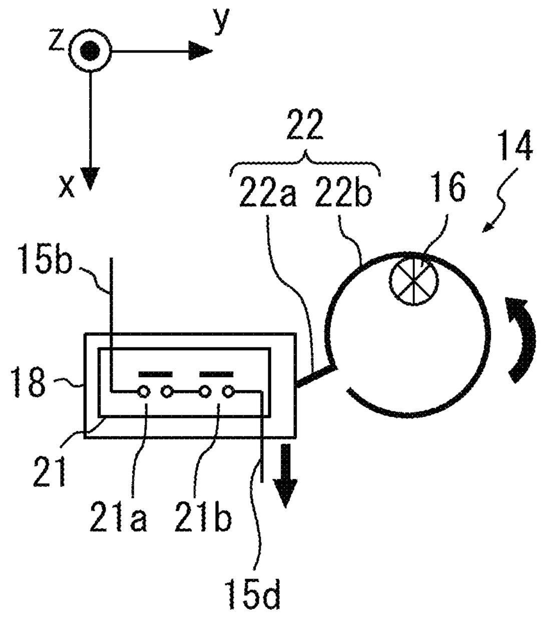
FIG. 6A and FIG. 6B are plan views for explaining an operation in a modification of the guide deviation detection device for elevators in the first embodiment.
Figure 6B:
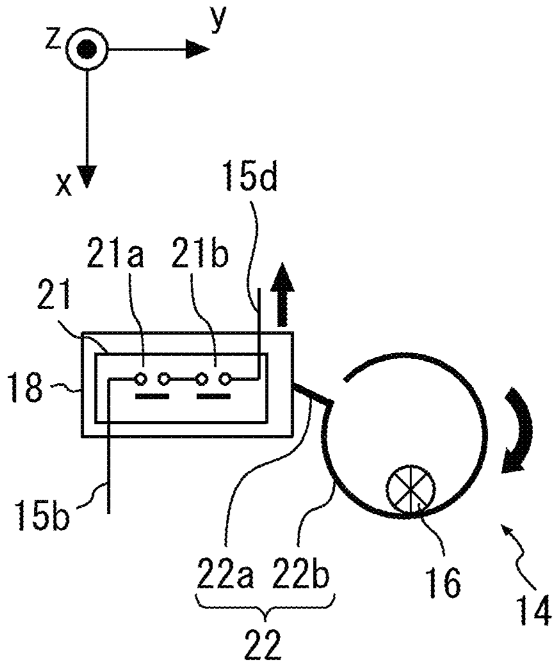

FIG. 6A and FIG. 6B are plan views for explaining an operation in a modification of the guide deviation detection device for elevators in the first embodiment.

As shown in FIG. 6A, when the counterweight 6 falls into the deviated-from-rail state in the +x direction, the guide deviation detection device 14 moves in the +x direction together with the counterweight 6. In this case, the third contact section 22*b* comes into contact with the wire 16 from a side in the −x direction. At this time, the arm section 22*a* changes a posture from the reference posture when the third contact section 22*b* only receives light force in the −x direction from the wire 16. Specifically, the arm section 22*a* rotates in the −x direction centering on a portion attached to the base 18. At this time, the detector 21 detects that the third contact section 22*b* has changed a posture from the reference posture.

As shown in FIG. 6B, when the counterweight 6 falls into the deviated-from-rail state in the −x direction, the guide deviation detection device 14 moves in the −x direction together with the counterweight 6. In this case, the third contact section 22*b* comes into contact with the wire 16 from a side in the +x direction. At this time, the arm section 22*a* changes a posture from the reference posture when the third contact section 22*b* only receives light force in the +x direction from the wire 16. Specifically, the arm section 22*a* rotates in the +x direction centering on the portion attached to the base 18. At this time, the detector 21 detects that the third contact section 22*b* has changed a posture from the reference posture.

According to the modification explained above, the third contact section 22*b* changes the posture irrespective of whether the counterweight 6 moves in the +x direction or the −x direction. Accordingly, it is possible to improve accuracy of detecting that the counterweight 6 has fallen into the deviated-from-rail state irrespective of whether the counterweight 6 moves in the +x direction or the −x direction.

INDUSTRIAL APPLICABILITY

As explained above, the guide deviation detection device for elevators according to the present disclosure can be used in the elevator system.

REFERENCE SIGNS LIST

1 Shaft, 2 Machine room, 3 Traction machine, 4 Main rope, 5 Car, 6 Counterweight, 7 Guide rail, 8*a* First guide shoe, 8*b* Second guide shoe, 9 Control panel, 10 Control circuit, 11 Guide deviation detection system, 12 Power circuit, 13 Relay, 13*a* Relay contact, 13*b* Relay contact, 13*c* Relay coil, 14 Guide deviation detection device, 15*a* Lead wire, 15*b* Lead wire, 15*c* Lead wire, 15*d* Lead wire, 16 Wire, 17 Signal output circuit, 18 Base, 19 First contact maker, 19*a* First attaching section, 19*b* First rotating section, 19*c* First contact section, 20 Second contact maker, 20*a* Second attaching section, 20*b* Second rotating section, 20*c* Second contact section, 21 Detector, 21*a* Contact, 21*b* Contact, 22 Contact maker, 22*a* Arm section, 22*b* Third contact section, 100 Elevator system

The invention claimed is:

1. A guide deviation detection device for elevators comprising:

a base provided in an ascending and descending body that ascends and descends while being guided;

a contact maker that is provided in the base to be adjacent to a long object positioned with an ascending and descending direction of the ascending and descending body set as a longitudinal direction thereof, does not come into contact with the long object to take a reference posture with respect to the base when the ascending and descending body is in a state in which the ascending and descending body is correctly guided with respect to the ascending and descending direction, and comes into contact with the long object to change a posture from the reference posture with respect to the base when the ascending and descending body changes to a state in which the ascending and descending body deviates from the state in which the ascending and descending body is correctly guided with respect to the ascending and descending direction; and a detector that is provided in the ascending and descending body and detects that the contact maker has changed the posture from the reference posture, the detector includes a pair of relays having contacts electrically connected in series with each other, the contacts being normally closed when the ascending and descending body operates in the state in which the ascending and descending body is correctly guided with respect to the ascending and descending direction;

wherein, the contact maker includes:

an arm section extending in a direction from the base in the reference posture to the long object; and a contact section coupled to the arm section and surrounding a part of an outer circumference of the long object in the reference posture, and when the ascending and descending body changes to the state in which the ascending and descending body deviates from the state in which the ascending and descending body is correctly guided with respect to the ascending and descending direction, and when the arm section changes a posture from the reference posture with respect to the base because the contact section comes into contact with the long object, the detector detects that the arm section has changed the posture from the reference posture and changes a state of the relays.

2. The guide deviation detection device for elevators according to claim 1, wherein, when a wire positioned with a longitudinal direction aligned with a guide rail for guiding the ascending and descending body in the ascending and descending direction is the long object, the contact section surrounds a part of an outer circumference of the wire.

3. The guide deviation detection device for elevators according to claim 1, wherein the detector is configured to cause each of the pair of relays to open their contacts based on the change in the posture from the reference posture.

4. The guide deviation detection device for elevators according to claim 3, wherein the contacts of each of the pair of relays are electrically connected in series with a wire connected to a control circuit that controls the elevators.

5. The guide deviation detection device for elevators according to claim 4, wherein the control circuit is arranged in a machine room above a shaft of the elevators.

* * * * *